United States Patent
Jeffreys et al.

[15] 3,637,395
[45] Jan. 25, 1972

[54] SILVER HALIDE EMULSIONS CONTAINING CYCLIC ENAMINE CYANINE DYES

[72] Inventors: Roy A. Jeffreys; Elizabeth A. Gloag, both of Harrow, England

[73] Assignee: Eastman Kodak Company, Rochester, N.Y.

[22] Filed: Apr. 9, 1970

[21] Appl. No.: 27,179

[52] U.S. Cl.....................................96/130, 96/131, 96/143, 260/240.4, 260/240.6
[51] Int. Cl.........................................G03c 1/08, G03c 1/10
[58] Field of Search.....................96/130, 131, 136, 141, 143

[56] References Cited

UNITED STATES PATENTS

| | | | |
|---|---|---|---|
| 2,263,749 | 11/1941 | White et al. | 96/130 |
| 2,646,430 | 7/1953 | Brooker et al. | 96/130 |
| 3,094,418 | 6/1963 | Haseltine et al. | 96/143 |
| 3,482,978 | 12/1969 | Fumia et al. | 96/127 |
| 3,506,655 | 4/1970 | Jeffreys | 96/127 |

*Primary Examiner*—J. Travis Brown
*Attorney*—W. H. J. Kline, J. R. Frederick and O. H. Webster

[57] ABSTRACT

Silver halide emulsions containing optical sensitizing cyanine and merocyanine dyes which feature a cyclic enamine group containing a bridgehead nitrogen selected from a 1,2,3,5,6,7-hexahydroindolizidine nucleus or a 1H-2,3,4,6,7,8-hexahydroquinolizidine nucleus.

13 Claims, No Drawings

SILVER HALIDE EMULSIONS CONTAINING CYCLIC ENAMINE CYANINE DYES

This invention relates to novel methine dyes, and more particularly to cyclic enamine dyes containing a bridgehead nitrogen atom, to new photographic emulsions and elements containing these dyes and to the preparation of these novel dyes and new photographic materials.

It is, accordingly, an object of this invention to provide a new class of methine dyes derived from cyclic enamines containing a bridgehead nitrogen.

Another object of this invention is to provide novel light-sensitive photographic silver halide emulsions containing one or more of the new dyes as spectral sensitizers therefor.

Still another object of this invention is to provide photographic elements comprising a support having thereon at least one novel emulsion layer of the invention.

Another object of this invention is to provide means for preparing these novel dyes and photographic materials.

Other objects of this invention will be apparent from this disclosure and the appended claims.

We have now found that methine dyes can be derived from cyclic enamines containing a bridgehead nitrogen atom. These novel dyes are excellent spectral sensitizers for light-sensitive photographic silver halide emulsions throughout the ultraviolet, visible and infrared regions. In general, the novel dyes of this invention cause only very low fog levels in both fresh and incubated emulsions, and the negative images produced with emulsions containing these dyes are clear and sharp, and of excellent contrast.

The novel methine dyes of this invention include those comprising first and second nuclei joined by a double bond or a methine linkage; the first of said nuclei being selected from the group consisting of (1) a nitrogen containing heterocyclic nucleus of the type used in cyanide dyes having from five to six nonmetallic atoms in the heterocyclic ring, and (2) a nitrogen containing ketomethylene heterocyclic nucleus of the type used in merocyanine dyes having from five to six atoms in the heterocyclic ring joined in each instance by a carbon atom of (1) or (2) to said linkage; and, said second nucleus being selected from the group consisting of (a) a 1,2,3,5,6,7-hexahydroindolizine nucleus (i.e., a $\Delta^8$-dehydroindolizidine nucleus) joined at the eight-carbon atom thereof to said linkage, and (b) a 1H-2,3,4,6,7,8-hexahydroquinolizine nucleus (i.e., a $\Delta^9$-dehydroquinolizidine nucleus) joined at the nine-carbon atom thereof to said linkage, to complete said dye. It is to be understood that nuclei (a) and (b) above are to be taken in a broad sense, that is, that they may also include nuclei having substituents on appropriate carbon atoms such as, for example, alkyl groups, e.g., methyl, isopropyl, isopropyl, butyl, etc.

The preferred novel methine dyes of this invention that are particularly useful herein include those represented by the following formulas:

I.
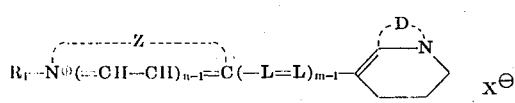
and
II.
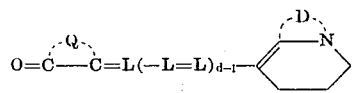

wherein $n$ and $d$ each represents a positive integer of from 1 to 2; $m$ represents a positive integer of from 1 to 3; L represents a methine linkage, e.g., $=CH-$, $=C(CH_3)-$, $=C(C_6H_5)$, etc.; D represents a divalent $\alpha,\omega$-alkylene group containing from three to four carbon atoms in the chain, e.g., trimethylene, tetramethylene, and includes lower alkyl substituted derivatives of the alkylene group, and preferably D represents the carbon atoms necessary to complete, with the nucleus to which it is fused, a 1,2,3,5,6-hexahydroindolizidine nucleus or a 1H-2,3,4,6,7,8-hexahydroquinolizidine nucleus; $R_1$ represents an alkyl group, including substituted alkyl, (preferably a lower alkyl containing from one to four carbon atoms) e.g., methyl, ethyl, propyl, isopropyl, butyl, hexyl, cyclohexyl, decyl, dodecyl, etc., and substituted alkyl groups (preferably a substituted lower alkyl containing from one to four carbon atoms), such as hydroxyalkyl group, e.g., $\beta$-hydroxyethyl, $\omega$-hydroxybutyl, etc., an alkoxy-alkyl group, e.g., $\beta$-methoxyethyl, $\omega$-butoxybutyl, etc., a carboxyalkyl group, e.g., $\beta$-carboxyethyl, $\omega$-carboxybutyl, etc., a sulfoalkyl group, e.g., $\beta$-sulfoethyl, $\omega$-sulfobutyl, etc., a sulfatoalkyl group, e.g., $\beta$-sulfatoethyl, $\omega$-sulfatobutyl, etc., an acyloxyalkyl group, e.g., $\beta$-acetoxyethyl, $\gamma$-acetoxypropyl, $\omega$-butyryloxybutyl, etc., an alkoxycarbonylalkyl group, e.g., $\beta$-methoxycarbonylethyl, $\omega$-ethoxycarbonylbutyl, etc., or an aralkyl group, e.g., benzyl, phenethyl, etc., or any aryl group, e.g., phenyl, tolyl, naphthyl, methoxyphenyl, chlorophenyl, etc., X represents an acid anion, e.g., chloride, bromide, iodide, perchlorate, sulfamate, p-toluenesulfonate, methyl sulfate, etc., and can be included in $R_1$, for example when $R_1$ represents a sulfoalkyl or carboxyalkyl group and the dye is in the form of its internal anhydride; Z represents the nonmetallic atoms necessary to complete a five- to six-membered heterocyclic nucleus of the type used in cyanine dyes, which nucleus may contain a second heteroatom such as oxygen, sulfur, selenium or nitrogen, such as the following nuclei: a thiazole nucleus, e.g., thiazole, 4-methylthiazole, 4-phenylthiazole, 5-methylthiazole, 5-phenylthiazole, 4,5-dimethylthiazole, 4,5-diphenylthiazole, 4-(2-thienyl)thiazole, benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 5-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, tetrahydrobenzothiazole, 5,6-dimethoxybenzothiazole, 5,6-dioxymethylenebenzothiazole, 5-hydroxybenzothiazole, 6-hydroxybenzothiazole, naphtho[2,1-d]thiazole, naphtho[1,2-d]thiazole, 5-methoxynaphtho[2,3-d]thiazole, 5-ethoxynaphtho[2,3-d]thiazole, 8-methoxynaphtho[2,3-d]thiazole, 7-methoxynaphtho[2,3-d]thiazole, 4'-methoxythianaphtheno-7', 6',-4,5-thiazole, etc.; an oxazole nucleus, e.g., 4-methyloxazole, 5-methyloxazole, 4-phenyloxazole, 4,5-diphenyloxazole, 4-ethyloxazole, 4,5-dimethyloxazole, 5-phenyloxazole, benzoxazole, 5-chlorobenzoxazole, 5-methylbenzoxazole, 5-phenylbenzoxazole, 6-methylbenzoxazole, 5,6-dimethylbenzoxazole, 4,6-dimethylbenzoxazole, 5-methoxybenzoxazole, 5-ethoxybenzoxazole, 5-chlorobenzoxazole, 6-methoxybenzoxazole, 5-hydroxybenzoxazole, 6-hydroxybenzoxazole, naphtho[2,1-d]oxazole, naphtho[1,2-d] oxazole, etc.; a selenazole nucleus, e.g., 4-methylselenazole, 4-phenylselenazole, benzoselenazole, 5-chlorobenzoselenazole, 5-methoxybenzoselenazole, 5-hydroxybenzoselenazole, tetrahydrobenzoselenazole, naphtho[2,1-d]selenazole, naphtho[1,2-d]selenazole, etc.; a thiazoline nucleus, e.g., thiazoline, 4-methylthiazoline, etc.; a pyridine nucleus, e.g., 2-pyridine, 5-methyl-2-pyridine, 4-pyridine, 3-methyl-4-pyridine, etc.; a quinoline nucleus, e.g., 2-quinoline, 3-methyl-2-quinoline, 5-ethyl-2-quinoline, 6-chloro-2-quinoline, 8-chloro-2-quinoline, 6-methoxy-2-quinoline, 8-ethoxy-2-quinoline, 8-hydroxy-2-quinoline, 4-quinoline, 6-methoxy-4-quinoline, 7-methyl-4-quinoline, 8-chloro-4-quinoline, 1-isoquinoline, 3,4-dihydro-1-isoquinoline, 3-isoquinoline, etc.; a 3,3-dialkylindolenine nucleus, e.g., 3,3-dimethylindolenine, 3,3,-5-trimethylindolenine, etc.; and, an imidazole nucleus, e.g., imidazole, 1-alkylimidazole, 1-alkyl-4-phenylimidazole, 1-alkyl-4,5-dimethylimidazole, benzimidazole, 1-alkylbenzimidazole, 1-aryl-5,6-dichlorobenzimidazole, 1-alkyl-1H- naphtho[1,2-d]imidazole, 1-aryl-3H-naphtho[1,2-d]imidazole, 1-alkyl-5-methoxy-1H-naphtho-[1,2-d]imidazole, etc.; and the like nuclei; and Q represents the nonmetallic atoms necessary to complete a five- to six-membered nucleus of the type used in merocyanine dyes, typically containing a heteroatom selected from nitrogen, sulfur, selenium, and oxygen, such as a 2-pyrazolin-5-one nucleus, e.g., 3-methyl-1-phenyl-2-pyrazolin-5-one, 1-phenyl-2-pyrazolin-5-one, 1-(2-benzothiazolyl)-3-methyl-2-pyrazolin-5-one, etc.; an isoxazolone nucleus, e.g., 3-phenyl-5(4H)-isoxazolone, 3-methyl-5(4H)-isoxazolone, etc.; an oxindole nucleus, e.g., 1-alkyl-2-oxindoles, etc.; a 2,4,6-triketohexahydropyrimidine nucleus, e.g., barbituric acid or 2-thiobarbituric acid as well as their 1-alkyl (e.g., 1-methyl, 1-ethyl, 1-propyl, 1-heptyl, etc.,) or 1,3-dialkyl (e.g., 1,3-dimethyl, 1,3-diethyl, 1,3-dipropyl, 1,3-diisopropyl, 1,3-dicyclohexyl, 1,3-di(β-methoxyethyl), etc.; or 1,3-diaryl (e.g., 1,3-diphenyl, 1,3-di(p-chlorophenyl), 1,3-di(p-ethoxycarbonylphenyl etc.; or 1-aryl (e.g., 1-phenyl, 1-p-chlorophenyl, 1-p-ethoxycarbonylphenyl), etc.; or 1-alkyl-3-aryl (e.g., 1-ethyl-3-phenyl, 1-n-heptyl-3-phenyl, etc.) derivatives; a rhodanine nucleus (i.e., 2-thio-2,4-thiazolidinedione series), such as rhodanine, 3-alkylrhodanines, e.g., 3-ethylrhodanine, 3-allyl-rhodanine, etc., 3-carboxyalkylrhodanines, e.g., 3-(2-carboxyethyl)rhodanine, 3-(4-carboxybutyl)rhodanine, etc., 3-sulfoalkylrhodanines, e.g., 3-(2-sulfoethyl)rhodanine, 3-(3-sulfopropyl)rhodanine, 3-(4-sulfobutyl)rhodanine, etc., or 3-arylrhodanines, e.g., 3-phenylrhodanine, etc., etc.; a 2(3H)-imidazo[1,2-a]pyridone nucleus; a 5,7-dioxo-6,7-dihydro-5-thiazolo[3,2-a]pyrimidine nucleus, e.g., 5,7-dioxo-3-phenyl-6,7-dihydro-5-thiazolo[3,2-a]-pyrimidine, etc.; a 2-thio-2,4-oxazolidinedione nucleus (i.e., those of the 2-thio-2,4(3H,5H)-oxazoledione series) e.g., 3-ethyl-2-thio-2,4-oxazolidinedione, 3-(2-sulfoethyl)-2-thio-2,4-oxazolidinedione, 3-(4-sulfobutyl)-2-thio-2,4-oxazolidinedione, 3-(3-carboxypropyl)-2-thio-2,4-oxazolidinedione, etc.; a thianaphthenone nucleus, e.g., 3-(2H)-thianaphthenone, etc.; a 2-thio-2,5-thiazolidinedione nucleus (i.e., the 2-thio-2,5-(3H,4H)-thiazoledione series), e.g., 3-ethyl-2-thio-2,5-thiazolidinedione, etc.; a 2,4-thiazolidinedione nucleus, e.g., 2,4-thiazolidinedione, 3-ethyl-2,4-thiazolidinedione, 3-phenyl-2,4-thiazolidinedione, 3-α-naphthyl-2,4-thiazolidinedione, tc.; a thiazolidinone nucleus, e.g., 4-thiazolidinone, 3-ethyl-4-thiazolidinone, 3-phenyl-4-thiazolidinone, 3-α-naphthyl-4-thiazolidinone, etc.; a 2-thiazolin-4-one nucleus, e.g., 2-ethylmercapto-2-thiazolin-4-one, 2-alkylphenylamino-2-thiazolin-4-one, 2-diphenylamino-2-thiazolin-4-one, etc.; a 2-imino-4-oxazolidinone (i.e., pseudohydantoin) nucleus; a 2,4-imidazolidinedione (hydantoin) nucleus, e.g., 2,4-imidazolidinedione, 3-ethyl-2,4-imidazolidinedione, 3-phenyl-2,4-imidazolidinedione, 3-α-naphthyl-2,4-imidazolidinedione, 1,3-diethyl-2,4-imidazolidinedione, 1-ethyl-3-phenyl-2,4-imidazolidinedione, 1-ethyl-3-α$\pi^{-naphthyl}$-2,4-imidazolidinedione, 1,3-diphenyl-2,4-imidazolidinedione, etc.; a 2-thio-2,4-imidazolidinedione (i.e., 2-thiohydantoin) nucleus, e.g., 2-thio-2,4-imidazolidinedione, 3-ethyl-2-thio-2,4-imidazolidinedione, 3-(4-sulfobutyl)-2-thio-2,4-imadazolidinedione, 3-(2-carboxyethyl)-2-thio-2,4-imidazolidinedione, 3-phenyl-2-thio-2,4-imidazolidinedione, 3-α-naphthyl-2-thio-2,4-imidazolidinedione, 1,3-diethyl-2-thio-2,4-imidazolidinedione, 1-ethyl-3-phenyl-2-thio-2,4-imidazolidinedione, 1-ethyl-3-α-naphthyl-2-thio-2,4-imidazolidinedione, 1,3-diphenyl-2-thio-2,4-imidazolidinedione, etc., a 2-imidazolin-5-one nucleus, e.g., 2-propylmercapto-2-imidazolin-5-one, etc., etc., (especially useful are nuclei wherein Q represents the nonmetallic atoms required to complete a heterocyclic nucleus containing five to six atoms in the heterocyclic ring, three to four of said atoms being carbon, and two of said atoms being selected from the group consisting of nitrogen, oxygen and sulfur, and at least one of said two atoms being a nitrogen atom). Dyes of formula II wherein Q is a rhodanine nucleus are especially powerful spectral sensitizers and are preferred herein.

The novel methine dyes of this invention can be conveniently prepared in a number of ways. For example, a number of the dyes defined by formula I above are advantageously prepared by heating a mixture comprising (1) a heterocyclic salt of the formula:

III.
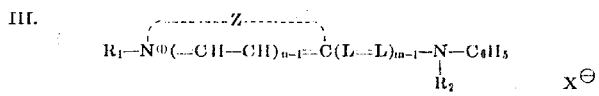

wherein $m$ is 2 or 3, $n$, L, $R_1$, X and Z are as previously defined, and $R_2$ represents a hydrogen atom or an acyl group, e.g., acetyl, benzoyl, etc.; and (2) a cyclic enamine salt of the formula:

IV.
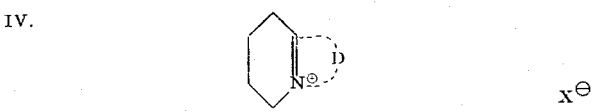

wherein D and X are as previously defined, in approximately equimolar proportions, in a solvent medium such as ethanol, ether, etc. Advantageously, a basic condensing agent such as triethylamine, etc., is to promote the reaction. The dyes are then separated from the reaction mixtures and purified by one or more recrystallizations from appropriate solvents such as ethanol, methanol/N,N-dimethylacetamide, benzene/petroleum ether, and the like. The dyes wherein the value of $m$ is 1 in formula I above are advantageously prepared, for example, by reacting (1) a heterocyclic salt of the formula:

V.
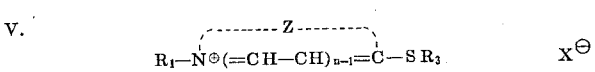

wherein $n$, $R_1$, X and Z are as previously defined, and $R_3$ represents an alkyl or aryl group, e.g., methyl, butyl, phenyl, etc., with (2) a cyclic enamine salt of formula IV above, under generally similar reaction conditions and purification of the dyes as described in the immediately preceding procedure.

The dyes defined by formula II above are also prepared, in general, by the above-described procedure using a cyclic enamine salt of formula IV above, except that the heterocyclic salt of formula III above is replaced by a ketomethylene heterocyclic compound of the formula:

VI.
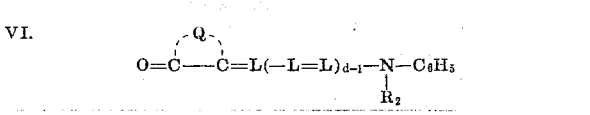

wherein $d$, L, $R_2$ and Q are as previously defined. Alternatively, the dyes of formula II can be prepared by condensing (1) a Δ$^8$-dehydroindolizidine with (2) an alkoxymethylene derivative of a ketomethylene heterocyclic compound of the formula:

VII.
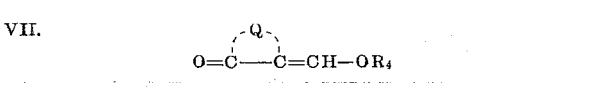

wherein Q is as previously defined and $R_4$ represents an alkyl group, e.g., methyl, butyl, etc., in the manner described in example 5 hereinafter.

In the preparation of photographic emulsions, the new dyes of the invention are advantageously incorporated in the finished silver halide emulsion and should, of course, be uniformly distributed throughout the emulsion. The methods of incorporating dyes in emulsions are relatively simple and well known to those skilled in the art of emulsion making. For example, it is convenient to add the dyes from solutions in appropriate solvents, in which the solvent selected should have no deleterious effect on the ultimate light-sensitive materials. Methanol, isopropanol, pyridine, etc., alone or in combination have proven satisfactory as solvents for the majority of our new dyes. The type of silver halide emulsions that are sensitized with our dyes include any of those prepared with hydrophilic colloids that are known to be satisfactory for dispersing light-sensitive silver halides, for example, emulsions prepared with hydrophilic colloids, such as, natural materials, e.g., gelatin, albumin, agar-agar, gum arabic, alginic acid, etc., and synthetic hydrophilic resins, e.g., polyvinyl alcohol, polyvinyl pyrrolidone, cellulose ethers, partially hydrolyzed cellulose acetate, and the like.

The concentration of our new dyes in the emulsion can be widely varied, i.e., generally from about 5 to about 100 mg. per liter of flowable emulsion. The specific concentration will vary according to the type of light-sensitive material in the emulsion and according to the effects desired. The most advantageous dye concentration for any given emulsion can be readily determined by making the tests and observations customarily used in the art of emulsion making. The dyes of this invention can be employed alone, in combination with each other, or in combination with other spectral sensitizing dyes. The emulsions are coated to advantage on any of the support materials used for photographic elements, for example, paper, glass, cellulose acetate, cellulose acetate-propionate, cellulose nitrate, polystyrene, polyesters, polyamides, etc.

To prepare a gelatinosilver halide emulsion sensitized with one of the new dyes, the following procedure is satisfactory: A quantity of the dye is dissolved in a suitable solvent and a volume of this solution containing from 5 to 100 mg. of dye is slowly added to about 1,000 cc. of a gelatinosilver halide emulsion. With most of the new dyes, 10 to 20 mg. of dye per liter of emulsion suffice to produce the maximum sensitizing effect with the ordinary gelatinosilver halides including silver chloride, bromide, bromoiodide, chlorobromide, chlorobromoiodide, etc., emulsions. With fine-grain emulsions, which include most of the ordinary employed gelatinosilver chloride emulsions and the like, somewhat larger concentrations of dye may be necessary to secure optimum sensitizing effect. While the preceding has dealt with emulsions comprising gelatin, it will be understood that these remarks apply generally to any emulsions wherein part or all of the gelatin is substituted by another suitable hydrophilic colloid such as mentioned above.

The above statements are only illustrative and are not to be understood as limiting the invention in any sense, as it will be apparent that the new dyes can be incorporated by other methods in many of the photographic silver halide emulsions customarily employed in the art. For instance, the dyes can be incorporated by bathing a plate or film upon which an emulsion has been coated, in the solution of the dye in an appropriate solvent. Bathing methods, however, are not to be preferred ordinarily.

Photographic silver halide emulsions, such as those listed above, containing the sensitizing dyes of our invention can also contain such addenda as chemical sensitizers, e.g., sulfur sensitizers (e.g., allyl thiocarbamide, thiourea, allylisothiocyanate, cystine, etc.), various gold compounds (e.g., potassium chloroaurate, auric trichloride, etc.) (see U.S. patents to W. D. Baldsiefen U.S. Pat. No. 2,540,085, granted Feb. 6, 1951; R. E. Damschroder U.S. Pat. No. 2,597,856, granted May 27, 1952, and H. C. Yutzy et al. U.S. Pat. No. 2,597,915, granted May 27, 1952), various palladium compounds, such as palladium chloride (W. D. Balsiefen U.S. Pat. No. 2,540,086, granted Feb. 6, 1951), potassium chloropalladate (R. E. Stauffer et al. U.S. Pat. No. 2,598,079, granted May 27, 1952), etc., or mixture of such sensitizers; antifoggants, such as ammonium chloroplatinate (A. P. H. Trivelli et al. U.S. Pat. No. 2,566,245, granted Aug. 28, 1951), ammonium chloroplatinate (A. P. H. Trivelli et al. U.S. Pat. No. 2,566,263, granted Aug. 28, 1951), benzotriazole, nitrobenzimidazole, 5-nitroindazole, benzidine, mercaptans, etc., (see Mees, "The Theory of the Photographic Process," MacMillan Pub., 1942, page 460), or mixtures thereof; hardeners, such as formaldehyde (A. Miller U.S. Pat. No. 1,763,533, granted June 10, 1930), chrome alum (U.S. Pat. No. 1,763,533), glyoxal (J. Brunken U.S. Pat. No. 1,870,354, granted Aug. 9, 1932, dibromacrolein (O. Block et al. British Pat. No. 406,750, accepted Mar. 8, 1934), etc., color couplers, such as those described in I. F. Salminen et al. U.S. Pat. No. 2,423,730, granted July 7, 1947, Spence and Carroll U.S. Pat. No. 2,640,776, issued June 2, 1953, etc.; or mixtures of such addenda. Dispersing agents for color couplers, such as those set forth in U.S. patents to E. E. Jelley et al. U.S. Pat. No. 2,322,027, granted June 15, 1943, and L. D. Mannes et al. U.S. Pat. No. 2,304,940, granted Dec. 15, 1942, can also be employed in the above-described emulsions.

The following examples further illustrate the novel dyes and photographic materials of this invention.

EXAMPLE 1

3-Ethyl-2-(1,2,3,5,6,7-hexahydroindolizin-8-yl)benzothiazolium perchlorate

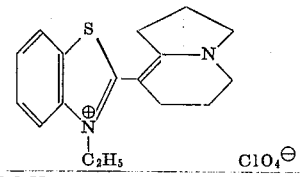

1H-2,3,5,6,7,8-Hexahydroindolizinium perchlorate (1.3 g.), 3-ethyl-2-ethylthiobenzothiazolium ethosulfate (1.9 g.), and triethylamine (1.0 ml.) are suspended in ethanol (15 ml.) and heated at reflux, with stirring, for 10 minutes. After chilling, the solid is collected on a filter and dried. The crude yield is 0.9 g. (43 percent). After one recrystallization from ethanol, the yield of purified dye is 0.4 g. (19 percent), m.p. 130°–131° C. dec.

EXAMPLE 2

3-Ethyl-2-[2-(1,2,3,5,6,7-hexahydroindolizin-8-yl)vinyl]-benzothiazolium perchlorate

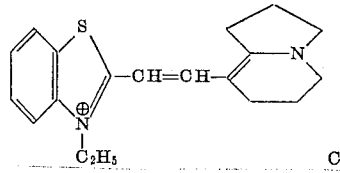

1H-2,3,5,6,7,8-Hexahydroindolizinium perchlorate (1.1 g.), 2-(2-acetanilidovinyl)-3-ethylbenzothiazolium iodide (2.3 g.), and triethylamine (1.0 ml.) are suspended in ethanol (15 ml.) and heated at reflux, with stirring, for 5 minutes. After chilling, the solid is collected on a filter and dried. The crude yield is 1.9 g. (90 percent). The crude dye is dissolved in a boiling methanol/N,N-dimethyl-acetamide mixture and the solution passed through a bed of Norite. After chilling, the purified dye is collected on a filter and dried. The yield is 0.8 g. (38 percent), m.p. 285°–286° C. dec. When the 2-(2-acetanilidovinyl)-3-ethylbenzothiazolium iodide in this example is replaced with 2-(2-acetanilidovinyl)-3-benzoselenazolium or with 2-(4-acetanilido-1,3-butadienyl)-3-ethylbenzothiazolium iodide, there are obtained 3-ethyl-2-[2-(1,2,3,5,6,7-hexahydroindolizin-8-yl)vinyl]benzoselenazolium perchlorate and 3-ethyl-2-[4-(1,2,3,5,6,7-hexahydroindolizin-8-yl)butadienyl]benzothiazolium iodide, respectively, which have generally similar properties as a spectral sensitizer for photographic silver halide emulsions. When example 2 is repeated but replacing 1H-2,3,5,6,7,8-hexahydroindolizinium perchlorate with 1H-2,3,4,5,7,8-hexahydroquinolizinium perchlorate, there is obtained 3-ethyl-2-[1,2,3,4,6,7,8-hexahydroquinolizin-9-yl)-methylene]benzothiazolium perchlorate which has generally similar properties as a spectral sensitizer for light sensitive photographic silver halide emulsions. Generally similar procedures can be employed to prepare 1-phenyl-4-(1,2,3,5,6,7-hexahydroindolizin-8-yl)quinolinium perchlorate, which is also useful in spectrally sensitizing photographic silver halide emulsions.

EXAMPLE 3

3-Ethyl-[2-(1,2,3,5,6,7-hexahydroindolizin-8-yl)vinyl]benzoxazolium perchlorate

1-H-2,3,5,6,7,8-Hexahydroindolizinium perchlorate (1.1 g.), 2-(2-acetanilidovinyl)-3-ethylbenzoxazolium iodide (2.2 g.), and triethylamine (1.0 ml.) are suspended in ethanol (15 ml.) and heated at reflux, with stirring, for 5 minutes. After chilling, the solid is collected on a filter and dried. The crude yield is 1.5 g. (75 percent). After one recrystallization from methanol, the yield of purified dye is 1.0 g. (50 percent), m.p. 253°–254° C. dec.

EXAMPLE 4

3-Ethyl-5-[(1,2,3,5,6,7-hexahydroindolizin-8-yl)methylene]rhodanine

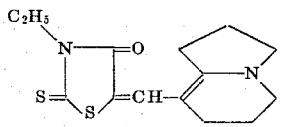

1H-2,3,5,6,7,8-hexahydroindolizinium perchlorate (1.1 g.), 5-acetanilidomethylene--ethylrhodanine (1.5 g.) and triethylamine (1.0 ml.) are suspended in ethanol (15 ml.) and heated at reflux, with stirring, for 10 minutes. After chilling, the solid is collected on a filter and dried. The crude yield is 0.6 g. (40 percent). After one recrystallization from methanol, the yield of purified dye is 0.45 g. (30 percent), m.p. 225°–226° C. dec. When this example is repeated but employing 5-acetanilidovinylallylidene-3-ethylrhodanine, there is obtained the photographic spectral sensitizing dye 3-ethyl-5-[(1,2,3,5,6,7-hexahydroindolizin-8-yl)allylidene rhodanine.

EXAMPLE 5

This example illustrates the preparation of the dye of above example 4 by an alternative procedure. Δ⁸-Dehydroindolizidine (0.45 g.) and 5-ethoxymethylene-3-ethylrhodanine (0.72 g.) with triethylamine (0.1 ml.) in ether (5 ml.) are refluxed together for 10 minutes. The solution is chilled, filtered and the product washed with a little ethanol. It is recrystallized from benzene/petroleum ether as red needles with a blue reflex, m.p. 238°–239° C., in 0.5 g. (47 percent) yield. In place of the 5-ethoxymethylene-3-ethylrhodanine in the above example, there can be substituted an equivalent amount of, for example, 4-ethoxymethylene-2-phenyl-2-oxazolin-5-one to give the corresponding novel methine dyes having generally similar spectral sensitizing properties for silver halide emulsions. Also, in place of the Δ⁸-dehydroindolizidine in the above example there can be substituted an equivalent amount of Δ⁹-dehydroquinolizidine which on condensing with 5-ethoxymethylene-3-ethylrhodanine gives the methine dye, 3-ethyl-5[(1H-2,3,4,6,7,8-hexahydroquinolizin-9-yl)methylene]rhodanine, which likewise is an excellent spectral sensitizer for silver halide emulsions.

The dyes of examples 1 to 4 above are tested in a gelatin silver chlorobromoiodide emulsion containing 90, 9 and 1 mole percent chloride, bromide and iodide, respectively. The dyes, dissolved in suitable solvents, are added to separate portions of the emulsion at the concentrations indicated. After digestion at 40° C. for 10 minutes, the emulsions are coated at a coverage of 450 mg. of silver per square foot on a cellulose acetate film support. A sample of each coating is exposed on an Eastman IB Sensitometer through a wedge spectrograph, processed for 6 minutes at 20° C. in Kodak developer D-19 which has the following composition:

| | |
|---|---|
| N-methyl-p-aminophenol sulfate | 2.0 g. |
| Hydroquinone | 8.0 g. |
| Sodium sulfite (desiccated) | 90.0 g. |
| Sodium carbonate (monohydrate) | 52.5 g. |
| Potassium bromide | 5.0 g. |
| Water to make | 1.0 l. | and then fixed in a conventional sodium thiosulfate fixing bath, washed and dried. The dye of example 5 above is tested by the same procedure, except that the emulsions employed are silver chlorobromide and silver bromoiodide. The sensitizing values obtained are shown in table 1 immediately below.

TABLE I

| Dye of Example Number | Dye concentration (g./mole silver) | Type of emulsion | Sensitization range (nm.) to | Sensitization maximum (nm.) |
|---|---|---|---|---|
| 1 | .10 | Chlorobromoiodide | 470 | 430 |
| 2 | .10 | do | 570 | 530 |
| 3 | .10 | do | 530 | 480 |
| 4 | .10 | do | 610 | 540 |
| 5 | .10 | Chlorobromide | 620 | 555 |
| 5 | .10 | Bromoiodide | 610 | 555 |
| Control (Examples 1-4) | None | Chlorobromoiodide | ca. 510 | ca. 450 |
| Control (Example 5) | do | Chlorobromide | 470 | 410 |
| Control (Example 5) | do | Bromoiodide | 515 | 465 |

These results indicate that the dyes of the preceding examples are all excellent spectral sensitizers for light-sensitive photographic silver halide emulsions of the negative type. The dye of examples 4 and 5 is especially useful showing approximately equal sensitivities in all three of the silver halide emulsions employed in the test.

EXAMPLE 6

Indolizidine

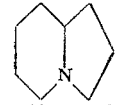

This compound is prepared in the manner described by Boekelheide and Rothchild, J. Am. Chem. Soc., 70, 864 (1948).

EXAMPLE 7

1H-2,3,5,6,7,8-Hexahydroindolizinium perchlorate

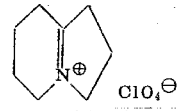

This compound is prepared by the mercuric acetate oxidation of example 6 in the manner described for the oxidation of quinolizidine by Leonard et al., J. Am. Chem. Soc., 77, 439 (1955).

EXAMPLE 8

Δ⁸-Dehydroindolizidine

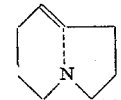

This compound is obtained in the oxidation of indolizidine with mercuric acetate according to the method of Leonard Middleton, Thomas and Choudhury, J. Org. Chem., 21, 344 (1956).

The cyclic enamine intermediates of the invention wherein D of formulas I and II represents a divalent alkylene group containing four carbon atoms in the chain such as Δ⁹-dehydroquinolizidine are described by M. G. Reinecke et al., J. Org. Chem., 31, 4215, (1966).

It will be evident from the foregoing description and examples, that yet other novel dyes of the invention embraced by formulas I and II above can be readily prepared by appropriate selection of the intermediates defined by formulas III to VII above, and that these dyes likewise will function as effective spectral sensitizers for light-sensitive photographic silver halide emulsions of the negative type.

The invention has been described in detail with particular reference to preferred embodiments thereof, but, it will be understood that variations and modifications can be effected within the spirit and scope of the invention.

We claim:

1. A light-sensitive photographic silver halide emulsion containing a methine dye comprising first and second nuclei joined by a linkage selected from the group consisting of a double bond and a methine linkage; the first of said nuclei being selected from the group consisting of (1) a nitrogen containing heterocyclic nucleus of the type used in cyanine dyes having from five to six atoms in the heterocyclic ring, and (2) a nitrogen containing ketomethylene heterocyclic nucleus of the type used in merocyanine dyes having from five to six atoms in the heterocyclic ring, joined at a carbon atom thereof to said linkage; and, said nucleus being a cyclic enamine selected from the group consisting of (a) a 1,2,3,5,6,7-hexahydroindolizine nucleus joined at the eight-carbon atom thereof to said linkage, and (b) a 1H-2,3,4,6,7,8-hexahydroquinolizine nucleus joined at the nine-carbon atom thereof to said linkage, to complete said dye.

2. A photographic silver halide emulsion in accordance with claim 1 wherein said first nucleus of said dye is a nitrogen containing heterocyclic nucleus of the type used in cyanine dyes having from five to six atoms in the heterocyclic ring.

3. A photographic silver halide emulsion in accordance with claim 1 wherein said first nucleus of said dye is a nitrogen containing ketomethylene heterocyclic nucleus of the type used in merocyanine dyes having from five to six atoms in the heterocyclic ring.

4. A photographic silver halide emulsion in accordance with claim 1 wherein said second nucleus is a 1,2,3,5,6,7-hexahydroindolizine nucleus.

5. A light-sensitive photographic silver halide emulsion containing a methine dye selected from those having one of the following formulas:

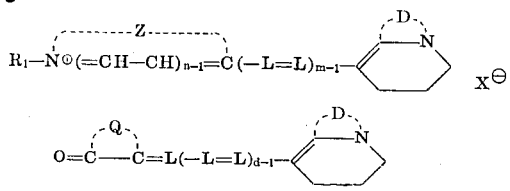

and wherein $d$ and $n$ each represents a positive integer of from 1 to 2; $m$ represents a positive integer of from 1 to 3; L represents a methine linkage; D represents a divalent $\alpha, \omega$-alkylene group containing from 3 to 4 carbon atoms in the chain; $R_1$ represents a member selected from the group consisting of an alkyl group and an aryl group; X represents an acid anion; Z represents the nonmetallic atoms necessary to complete a nucleus of the type used in cyanine dyes having from five to six atoms in the heterocyclic ring; and, Q represents the nonmetallic atoms necessary to complete a nitrogen containing ketomethylene heterocyclic nucleus of the type used in merocyanine dyes having from five to six atoms in the heterocyclic ring.

6. A photographic silver halide emulsion in accordance with claim 5 wherein said dye is a cyanine dye and said Z of said dye represents the nonmetallic atoms necessary to complete a nucleus selected from the group consisting of a thiazole nucleus and an oxazole nucleus.

7. A photographic silver halide emulsion in accordance with claim 5 wherein said dye is a merocyanine dye and said Q of said dye represents the nonmetallic atoms necessary to complete a rhodanine nucleus.

8. A photographic silver halide emulsion in accordance with claim 5 wherein said D in said dye formulas represents a trimethylene group.

9. A light-sensitive photographic silver halide emulsion containing a methine dye selected from the group consisting of 3-ethyl-2-(1,2,3,5,6,7-hexahydroindolizin-8-yl)benzothiazolium perchlorate, 3-ethyl-2-[1,2,3,5,6,7-hexahydroindolizin-8-yl)vinyl]benzothiazolium perchlorate, 3-ethyl-[2-(1,2,3,5,6,7-hexahydroindolizin-8-yl)vinyl]benzoxazolium perchlorate, and 3-ethyl-5-[(1,2,3,5,6,7-hexahydroindolizin-8-yl)methylene]rhodanine.

10. A light-sensitive photographic silver halide emulsion containing as spectral sensitizer the dye 3-ethyl-5-[(1,2,3,5,6,7-hexahydroindolizin-8-yl)methylene]rhodanine.

11. A photographic element comprising a support having thereon at least one layer containing a light-sensitive photographic silver halide emulsion of claim 1.

12. A photographic element comprising a support having thereon at least one layer containing a light-sensitive photographic silver halide emulsion of claim 5.

13. A photographic element comprising a support having thereon at least one layer containing a light-sensitive photographic silver halide emulsion of claim 10.

* * * * *